US009269324B2

(12) United States Patent
Cunningham (10) Patent No.: US 9,269,324 B2
(45) Date of Patent: Feb. 23, 2016

(54) ORIENTATION AWARE APPLICATION DEMONSTRATION INTERFACE (75) Inventor: Benjamin Grady Cunningham, San Francisco, CA (US)

(73) Assignee: Blackboard Inc., Washington, DC (US)

( * ) Notice: Subject to any disclaimer, the term of this patent is extended or adjusted under 35 U.S.C. 154(b) by 360 days.

(21) Appl. No.: 13/538,730

(22) Filed: Jun. 29, 2012

(65) Prior Publication Data

US 2014/0002494 A1    Jan. 2, 2014

(51) Int. Cl.
*G09G 5/00* (2006.01)
*H04W 4/02* (2009.01)

(52) U.S. Cl.
CPC .............. *G09G 5/00* (2013.01); *H04W 4/026* (2013.01); *G09G 2340/14* (2013.01)

(58) Field of Classification Search
CPC ..... G09G 5/00; G09G 5/377; G09G 2340/14; G06T 15/00; G06T 3/40; G06T 3/60; H04W 4/026
USPC ......... 345/633, 629, 632, 173, 422, 649, 672, 345/676, 419
See application file for complete search history.

(56) References Cited

U.S. PATENT DOCUMENTS

2010/0328344 A1*  12/2010  Mattila et al. ................. 345/633
2011/0249024 A1*  10/2011  Arrasvuori et al. .......... 345/629
2012/0194547 A1*   8/2012  Johnson et al. .............. 345/632
2013/0328925 A1*  12/2013  Latta et al. ................... 345/633

OTHER PUBLICATIONS

"Augmented Reality Browser: Layar", Feb. 28, 2012, retrieved from <http://www.layar.com>.
Parr, Ben, "Easter Egg: Yelp Is the iPhone's First Augmented Reality App", Mashable, Aug. 27, 2009, retrieved from <http://mashable.com/2009/08/27/yelp-augmented-reality/>.

* cited by examiner

*Primary Examiner* — Kee M Tung
*Assistant Examiner* — Michael Le
(74) *Attorney, Agent, or Firm* — McDermott Will & Emery LLP (57) ABSTRACT Methods for presenting an orientation aware application on a device are provided. In one aspect, a method includes receiving visual data providing an image of a physical three-dimensional environment and orientation data indicating an orientation of an actual device within the physical three-dimensional environment, and providing, for display on the actual device, a visual representation of a virtual device displaying an orientation aware application using the image of the physical three-dimensional environment. The visual representation of the virtual device appears within a simulated three-dimensional environment that is based on the orientation data indicating the orientation of the actual device within the physical three-dimensional environment. At least a portion of the area surrounding the visual representation of the virtual device includes a display of the simulated three-dimensional environment. Systems and machine-readable storage media are also provided.

22 Claims, 9 Drawing Sheets

ORIENTATION AWARE APPLICATION DEMONSTRATION INTERFACE

BACKGROUND

1. Field

The present disclosure generally relates to computing data, and more particularly to the use of a computing device to display data.

2. Description of the Related Art

Augmented reality (AR) is commonly described as a live, direct or indirect, view of a physical, real-world environment whose elements are augmented by computer-generated sensor input such as sound, video, graphics or global positioning system data. AR software applications, which are types of orientation aware applications, are often used on mobile devices to assist users in finding physical objects or locations in the physical world by displaying computer-generated visual objects near the physical objects or locations.

It is difficult to properly demonstrate to an audience orientation aware applications that participate in three-dimensional space, such as AR applications. Specifically, in order to properly demonstrate an orientation aware application to an audience, the audience should understand the orientation and movement of the device running the orientation aware application. This allows the audience to more accurately understand the extent to which the orientation aware application is responding to a demonstrator's movement. This understanding is difficult to achieve if a viewer in the audience does not share the same viewpoint as the demonstrator. For example, as illustrated in the setup 100 of FIG. 1, one existing approach to addressing this issue has been to employ a camera person 101 with a video camera 102 that follows behind the demonstrator 103 holding a device 105 and attempts to capture the demonstrator's point of view of an environment 106. The video feed of the camera is then displayed on a screen 107 that can be viewed by the audience. This approach, however, requires logistical coordination, an additional video camera 102, and an additional person 101 present. Additionally, the resulting demonstration is often ineffective, as it is very difficult for the video camera person to capture the demonstrator's point of view by following the demonstrator around and pointing a camera over the demonstrator's shoulder.

SUMMARY

Certain embodiments of the disclosure provide an orientation aware three-dimensional demonstration application that runs on a demonstrating device. The demonstration application captures a demonstrator's point of view for running the orientation aware application, which can be an augmented reality application, and shares the demonstrator's point of view of the orientation aware application with an audience. In certain aspects, the demonstration application provides a display of a virtual device running the orientation aware application within a display of a simulated three-dimensional environment. The position of the virtual device that is displayed on the demonstrating device remains a fixed distance away along the z-axis (e.g., depth axis, in front of the demonstrator), and remains perpendicular to the z-axis (e.g. straight on) so as to better mirror the demonstrator's simulated viewpoint (e.g. holding a phone directly in front of the demonstrator). This facilitates a more intelligible viewpoint as if the audience were a user of the device themselves.

According to one embodiment of the present disclosure, a computer-implemented method for presenting an orientation aware application on a device is provided. The method includes receiving visual data providing an image of a physical three-dimensional environment and orientation data indicating an orientation of an actual device within the physical three-dimensional environment, and providing, for display on the actual device, a visual representation of a virtual device displaying an orientation aware application using the image of the physical three-dimensional environment. The visual representation of the virtual device appears within a simulated three-dimensional environment that is based on the orientation data indicating the orientation of the actual device within the physical three-dimensional environment. At least a portion of the area surrounding the visual representation of the virtual device includes a display of the simulated three-dimensional environment.

According to another embodiment of the present disclosure, a system for presenting an orientation aware application on a device is provided. The system includes a memory that includes an orientation aware application, and a processor. The processor is configured to execute instructions to receive visual data providing an image of a physical three-dimensional environment and orientation data indicating an orientation of an actual device within the physical three-dimensional environment, and provide, for display on the actual device, a visual representation of a virtual device displaying the orientation aware application using the image of the physical three-dimensional environment. The visual representation of the virtual device appears within a simulated three-dimensional environment that is based on the orientation data indicating the orientation of the actual device within the physical three-dimensional environment. At least a portion of the area surrounding the visual representation of the virtual device includes a display of the simulated three-dimensional environment.

According to one embodiment of the present disclosure, a machine-readable storage medium includes machine-readable instructions for causing a processor to execute a method for presenting an orientation aware application on a device is provided. The method includes receiving visual data providing an image of a physical three-dimensional environment and orientation data indicating an orientation of an actual device within the physical three-dimensional environment, and providing, for display on the actual device, a visual representation of a virtual device displaying an orientation aware application using the image of the physical three-dimensional environment. The visual representation of the virtual device appears within a simulated three-dimensional environment that is based on the orientation data indicating the orientation of the actual device within the physical three-dimensional environment. At least a portion of the area surrounding the visual representation of the virtual device includes a display of the simulated three-dimensional environment.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Figure 2:
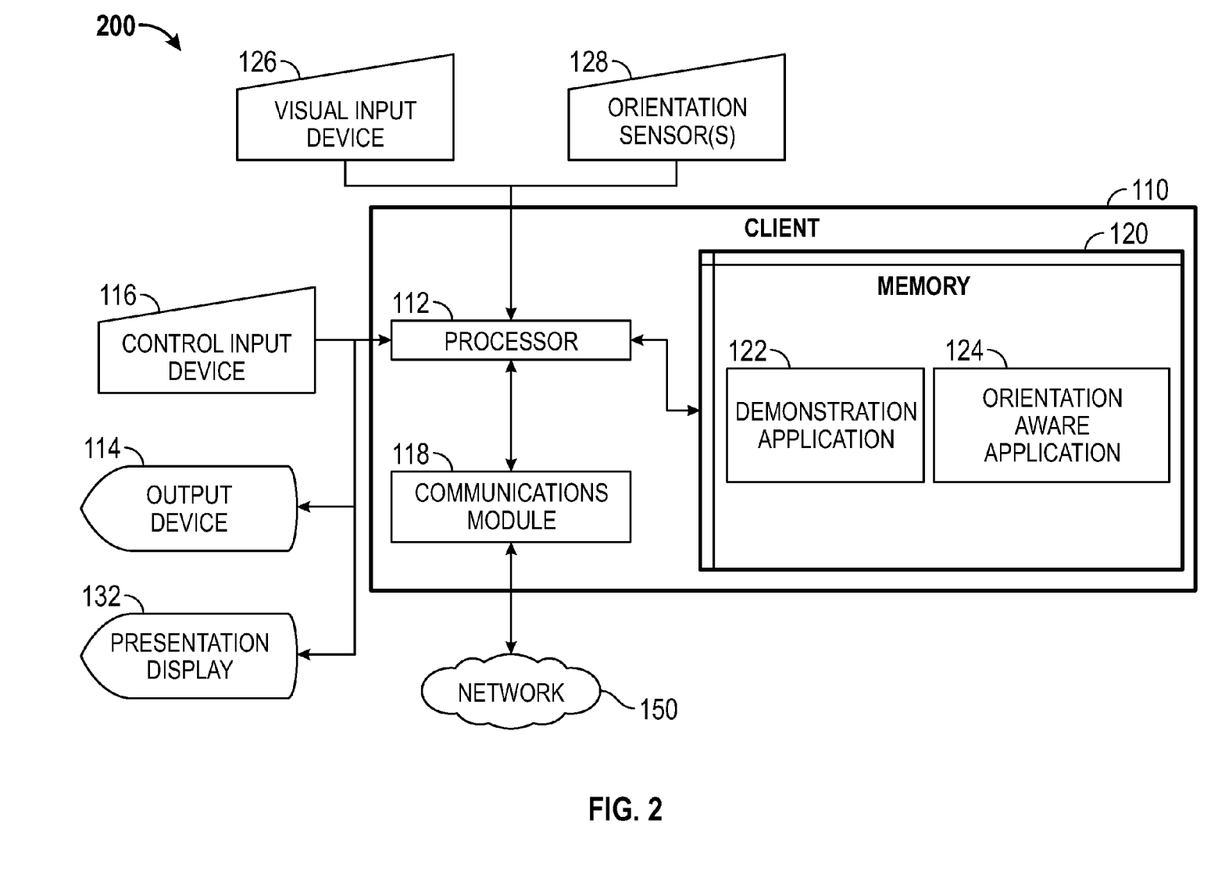
FIG. 2 illustrates a block diagram illustrating an exemplary client for presenting an orientation aware application on a device according to certain aspects of the disclosure.

FIG. 2 is a block diagram 200 illustrating an exemplary client 110 according to certain aspects of the disclosure. The client 110 can be connected to a network 150 via a communications module 118, for example, in order to connect to a server. The communications module 118 is configured to interface with the network 150 to send and receive information, such as data, requests, responses, and commands to other devices on the network. The communications module 118 can be, for example, a modem or Ethernet card. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The client 110 includes a processor 112, a communications module 118, and a memory 120 that includes an orientation aware application 124, such as an augmented reality application, and a demonstration application 122. The orientation aware application 124 can also be, for example, mapping applications, location tracking applications, or ease of access applications. Although the orientation aware application 124 is often referred to herein in examples as an augmented reality application, the disclosed system is configured to operate with other orientation aware applications because the orientation aware applications will operate in the same physical three-dimensional space as the demonstration application 122.

The demonstration application 122 provides a virtual computing environment (or "wrapper") in which the orientation aware application 124 can run. The demonstration application can be a mobile application ("mobile app") or another format of software configured for running on the client 110. The client 110 also includes an output device 114 (e.g., touchscreen display), a presentation display 132, a control input device 116 (e.g., keyboard or touchscreen input), a visual input device 126 (e.g., camera), and orientation sensor(s) 128.

The presentation display 132 can be, for example, a projection device for displaying the output of the demonstration application 122 to an audience. The presentation display 132 displays substantially the same visual output as the output device 114 of the client 110. The orientation sensor(s) can include, but are not limited to, a geolocation sensor (e.g., a Global Positioning System (GPS) device), a gyroscope, an accelerometer, and a compass. The client 110 can be, for example, a mobile device such as a smartphone, personal digital assistant, portable gaming console, or a tablet computer (e.g., including an e-book reader). The client 110 can also be another device capable of using an augmented reality application, such as a desktop computer or mobile computer, or any other devices having appropriate processor, memory, and communications capabilities.

The processor 112 of the client 110 is configured to execute instructions, such as instructions physically coded into the processor 112, instructions received from software in memory 120 (e.g., the demonstration application 122), or a combination of both. For example, the processor 112 of the client 110 executes instructions to receive visual data (e.g., from visual input device 126) providing an image of a physical three-dimensional environment, and orientation data (e.g., from orientation sensor(s) 128) indicating an orientation of the client 110 within the physical three-dimensional environment. The visual data can be, for example, a video feed from a camera 126 of the client 110 or a sequence of images from the camera 126 of the client 110. Although the examples discussed herein refer to the image of the physical three-dimensional environment, in certain aspects, an image of the physical three-dimensional environment is not required and therefore not provided by the processor. In such instances, a virtual and/or interpreted graphical representation of a two or three-dimensional application environment can be generated and manipulated (e.g., by the orientation aware application 124) based on the provided orientation data. The orientation data can, for example, provide an estimate of a position (e.g., latitude and longitude) and bearing (e.g., a three-dimensional rotation matrix or other expression of general orientation) of the client 110 on Earth. The orientation data can be provided both to the orientation aware application 124 and the demonstration application 122 to similarly orient a simulated three-dimensional environment with the physical three-dimensional environment for both the orientation aware application 124 and the demonstration application 122.

The processor 112 of the client 110 is also configured to execute instructions to provide, for display on the client 110 (e.g., on output device 114), a visual representation of a virtual device displaying the orientation aware application 124 using the image of the physical three-dimensional environment. The visual representation of the virtual device appears (e.g., on output device 114 and presentation display 132) within the simulated three-dimensional environment. The visual representation can be, for example, an image of the virtual device. For instance, if the virtual device is a smartphone, the visual representation can be an image of the smartphone. The smartphone can appear to be displaying or running the augmented reality application. At least a portion of the area surrounding the visual representation of the virtual device includes a display of the simulated three-dimensional environment. For example, if the simulated three-dimensional environment is a virtual sphere, then the area in the display of the client 110 that surrounds the image of the smartphone can display a virtual sphere.

The display of the visual representation of the virtual device and the display of the surrounding simulated three-dimensional environment can be continuously updated based on the received orientation data indicating the orientation of the client 110 within the physical three-dimensional environment. For example, as the client 110 moves in orientation in the physical three-dimensional environment, the display of the visual representation of the visual device and the display of the simulated three-dimensional environment are continuously updated. For instance, the video feed data can be provided and displayed as a continuous stream, and the display of the virtual device and the display of surrounding the simulated three-dimensional environment can move in orientation based on movement of the client 110. In certain aspects, the perceived virtual position of the virtual device within the simulated three-dimensional environment can also move in position based on movement of the client 110, such as by the communication of positional changes. Specifically, because the simulated three-dimensional environment is moving (e.g., translating) rather than the visual representation of the virtual device itself, the implied position of the virtual device is moving rather than the virtual device moving itself (e.g., the device doesn't deviate from its position a fixed distance away along the z-axis). For example, a surrounding virtual environment could translate (rather than rotate) relative to the virtual device to suggest that the virtual device is changing position. This can be accomplished by the same approach that is used for the rotational changes of the virtual device.

The field of view of the simulated environment is intended to mirror a vision of a person. Thus, the field of view of the simulated three-dimensional environment is set based on an intended observer's distance from the display 132 and the size of the display 132 via an appropriate user interface. The angles subtended by the display 132 in the eyes of the intended observer are used as field of view parameters of the displayed simulated three-dimensional environment. Thus, the closer the observer is to the display 132, the wider the field of view will become, and the closer the field of view will become to the natural field of view of the human vision system (e.g., about 160°×175°). This results in a demonstration in which the field of view parameters of the simulated three-dimensional environment match those of the environment an observer would expect to perceive if the presentation display were a transparent window to the physical world. Moreover, in certain aspects, the size of the virtual device can be scaled proportionately according to the field of view parameters of the visual input device 126. That is to say, if the y-axis field of view of the visual input device is the same as the chosen y-axis field of view of the simulated three-dimensional environment, then the virtual device can be scaled to fill the entire height of the output device 114. Similarly, if the y-axis field of view of the visual input device is half of the simulated three-dimensional environment, then the virtual device can be scaled to be half the height of the output device 114. This scaling aspect facilitates establishment of an intuitive visual continuity between the physical world displayed on the virtual device and the simulated world in which the virtual device is situated.

Figure 3:
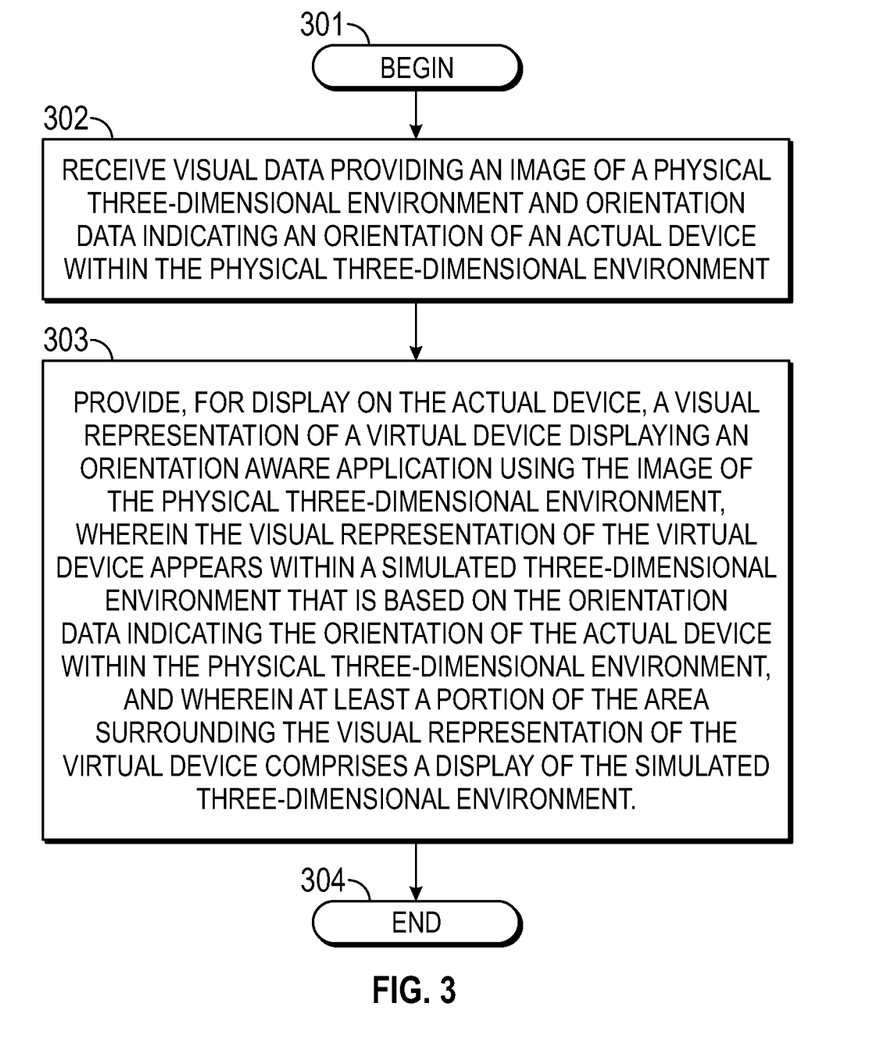
FIG. 3 illustrates an exemplary process for presenting an orientation aware application on a device using the exemplary client of FIG. 2.

FIG. 3 is an exemplary process 300 for presenting an orientation aware application 124 using the client 110 of FIG. 2. The process 300 begins by proceeding from step 301 when a user, for example, loads the demonstration application 122 on the client 110, to step 302, where visual data providing an image of a physical three-dimensional environment and orientation data indicating an orientation of the client 110 within the physical three-dimensional environment are received (e.g., from visual input device 126 and orientation sensor(s) 128, respectively). Next, in step 303, a visual representation of a virtual device displaying the orientation aware application 124 using the image of the physical three-dimensional environment is provided for display on the client 110 (e.g., on the output device 114 and presentation display 132). The visual representation of the virtual device appears within a simulated three-dimensional environment that is based on the orientation data indicating the orientation of the client 110 within the physical three-dimensional environment, and at least a portion of the area surrounding the visual representation of the virtual device comprises a display of the simulated three-dimensional environment. The process 300 then ends in step 304.

FIG. 3 sets forth an exemplary process 300 for presenting an orientation aware application 124 using the client 110 of FIG. 2. An example will now be described using the exemplary process 300 of FIG. 3, and a demonstrating user ("demonstrator") using a tablet computer as the client 110 to demonstrate an orientation aware application 124 that is an augmented reality application for a virtual device that is a smartphone.

The process 300 begins by proceeding from step 301 when the demonstrator loads the demonstration application 122 on the tablet computer 110. The demonstrator intends to demonstrate, to a large audience, how the augmented reality application 124 would run on a smartphone using a presentation display 132 that is a projection screen. In step 302, a video feed providing images of the physical three-dimensional environment around the demonstrator and orientation data indicating an orientation of the tablet computer 110 within the physical three-dimensional environment are received by the tablet computer 110. The video feed is received from a camera 126 on the tablet computer 110. The orientation data is received from a GPS device, gyroscope, compass, and accelerometer 128 on the tablet computer 110.

Figure 4A:
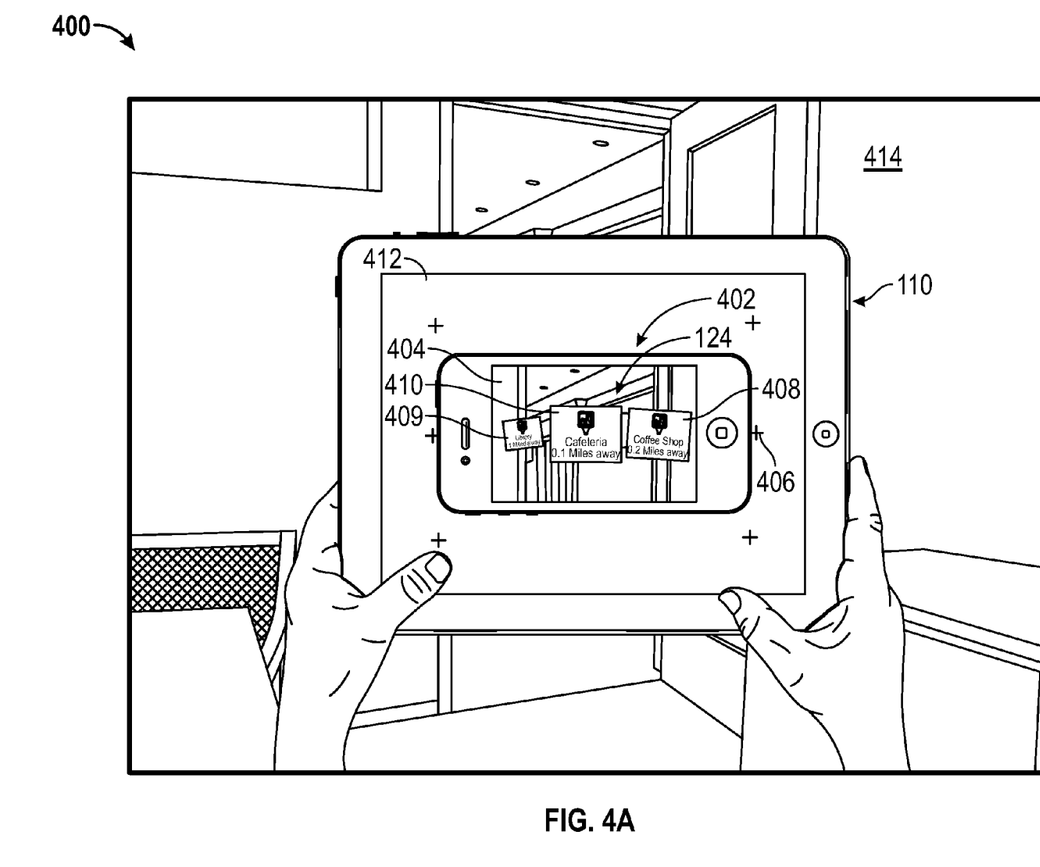
FIGS. 4A-4E are exemplary illustrations associated with the exemplary process of FIG. 2.

As provided in the exemplary illustration 400 of FIG. 4A, in subsequent step 303, a visual representation of the virtual smartphone 402 displaying the augmented reality application 124 with the video feed 404 of the physical three-dimensional environment is provided for display on the tablet computer 110. The tablet computer 110 is being held up by the demonstrator in a physical three-dimensional environment 414 in landscape orientation.

Figure 4B:
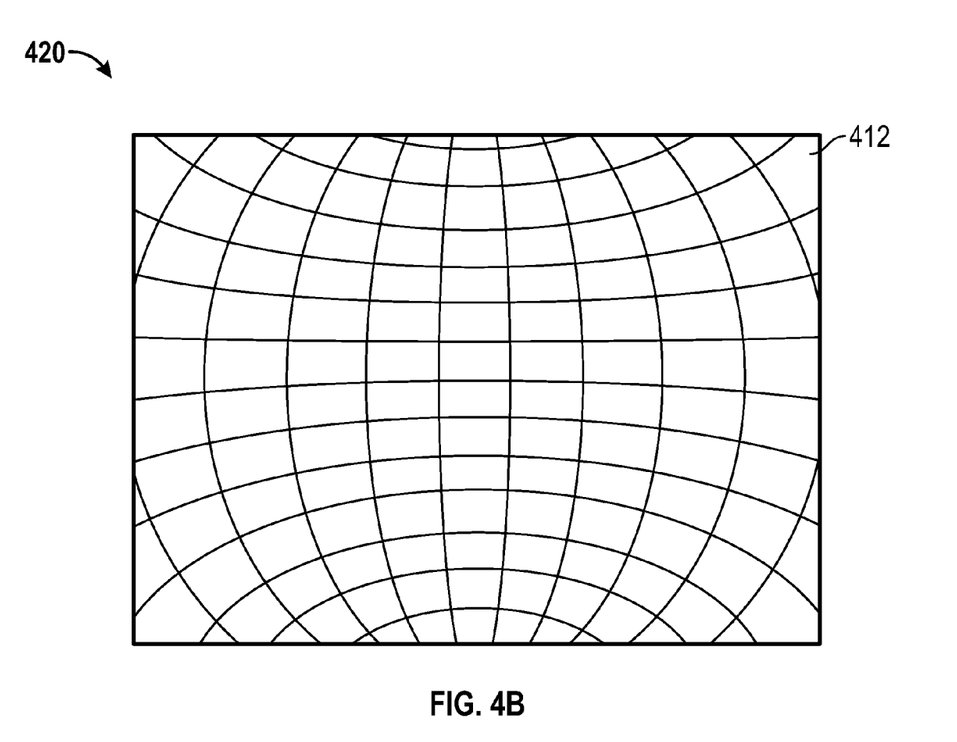

The augmented reality application 124 displays three virtual objects 409, 410, and 408 indicating locations in the physical three-dimensional environment 404. The visual representation of the virtual smartphone 402 appears within a simulated three-dimensional environment 412 that is based on the orientation data. FIG. 4B provides an example illustration 420 of the simulated three-dimensional environment 412. The simulated three-dimensional environment 412 is displayed as a spherical three-dimensional environment. In certain aspects, the simulated three-dimensional environment 412 can be displayed as a flat three-dimensional environment (e.g., cuboid-shaped environment). The simulated three-dimensional environment 412 can be also be displayed in other three-dimensional shapes, such as but not limited to a cube, cylinder, hexagonal prism, cone, square-based pyramid, triangular based pyramid, or triangular prism.

Figure 4C:
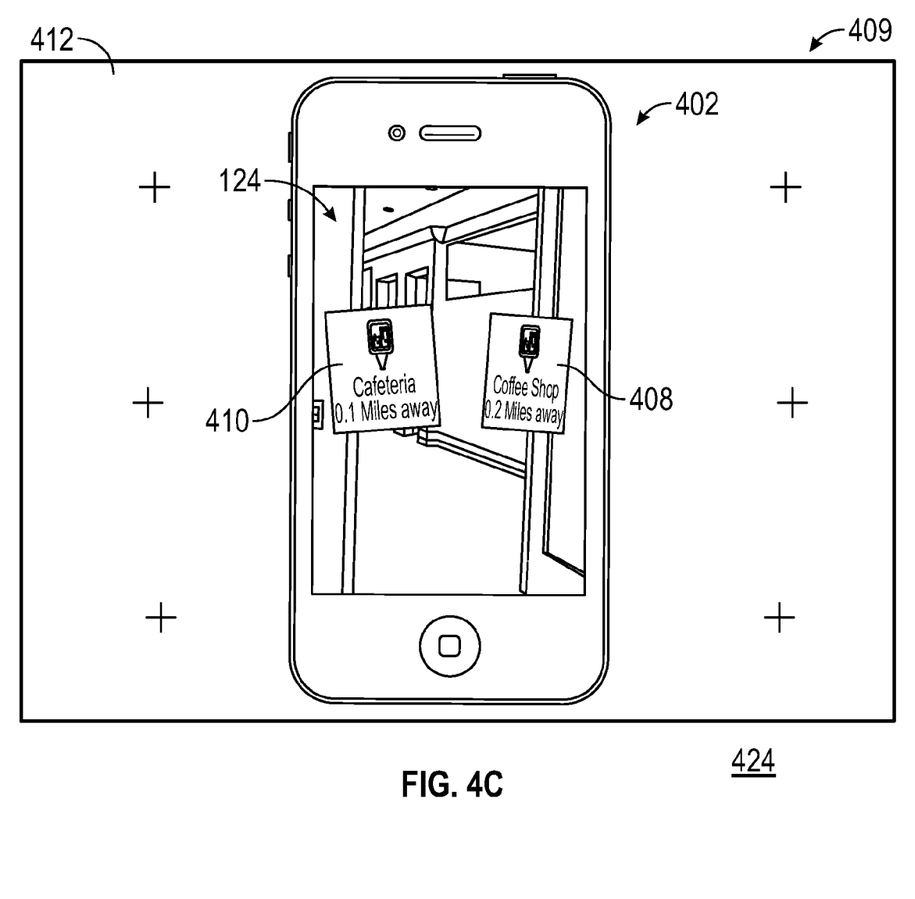

FIG. 4C provides another illustration 424 of the tablet computer 110. The display 409 of the tablet computer 110 in FIG. 4C is substantially similar to what is displayed to the audience via the projection screen 132. In FIG. 4C, the simulated three-dimensional environment 412 of FIG. 4B is indicated by the plus symbols that surround the visual representation of the smartphone 402. By displaying the simulated three-dimensional environment 412 around the visual representation of the smartphone 402 in the display of the tablet computer 110, an audience member is given a better context and understanding of the demonstrating user's experience of using the augmented reality application 124. Specifically, because the audience is provided with visual information on the smartphone 402 as it appears to run the augmented reality application 124 within a consistent context of the illustrated simulated three-dimensional environment 412, each audience member can have a better understanding of how the augmented reality application 124 would work on the smartphone 402 if the audience member were holding the smartphone 402. Each virtual object 410 and 408 is different and size and position based on its position within orientation aware application 124. The orientation aware application 124 is provided information for determining size and position based on the orientation data provided by the orientation sensors 128 of the tablet computer 110. For example, the first virtual object 410 is identified as being closer to the user as part of the orientation aware application 124 than the second virtual object 408, so the first virtual object 410 appears larger than the second virtual object 408. Additionally, the first virtual object 410 is identified as being slightly to the left of the user as part of the orientation aware application 124; therefore, the first virtual object 410 is slightly angled towards the left. Similarly, the second virtual object 408 is identified as being slightly to the right of the user as part of the orientation aware application 124; therefore, the second virtual object 408 is slightly angled towards the right. The determination of how to display the virtual objects 410 and 408 is made by the orientation aware application 124, not the demonstration application 122.

The simulated three-dimensional environment 412 remains faithful to the subtended field of view of the audience. As a result, the audience's experience of the simulated three-dimensional environment 412 is more natural because the three-dimensional environment 412 is displayed within a visual scope that is consistent with what the audience expects. The visual representation of the smartphone 402 is proportionally scaled according to the relative field of view of the physical three-dimensional environment displayed within it. As a result, the audience's experience of the physical three-dimensional world 124 is consistent with the context provided by the simulated three-dimensional environment. This consistency establishes visual coherency between the simulated world and the displayed physical world, making for a natural, accurate, intuitive demonstration. The output is displayed to the audience via a projection screen 132

The visual representation of the smartphone 402 is based on a degree of rotation of the tablet computer 110 about its z-axis. For example, the demonstrator can change the rotation of the tablet computer 110 from being held in a first position in front of the demonstrator in a landscape mode as illustrated in FIG. 4A, to having the tablet computer 110 being held in a second position in front of the demonstrator in a portrait mode as illustrated in FIG. 4C. As a result, the visual representation of the smartphone 402 rotates about the z-axis, namely, from landscape mode as illustrated in FIG. 4A to portrait mode as illustrated in FIG. 4C. This rotation can be applied continuously, even for orientations that are neither strictly portrait nor strictly landscape (e.g. any degree of rotation about the z-axis of tablet computer 110). This rotation mimics the visual experience of a user rotating a smartphone about its z-axis, and allows the audience to understand it as such. The augmented reality application 124 responds to the rotation of tablet computer 110 accordingly, and displays fewer virtual objects (e.g., no longer displaying virtual object 409) because the smartphone 402 is in the second (e.g., portrait) position. The augmented reality application 124 is configured to respond appropriately to orientation changes because the orientation data provided to the demonstration application 122 is also provided to the augmented reality application 124. As a result, the demonstration application 122 and augmented reality application 124 react to orientation changes in a similar fashion. In certain aspects, rotation of the tablet computer 110 about the z-axis can be calculated by acceleration due to gravity along the x and y axes of the device. Specifically, to determine an amount of rotation θ about the z-axis the calculation "θ=arctan(y/x)" can be used, where x is the acceleration due to gravity along the x axis of the device and y the acceleration due to gravity along the y axis of the device.

Figure 4D:
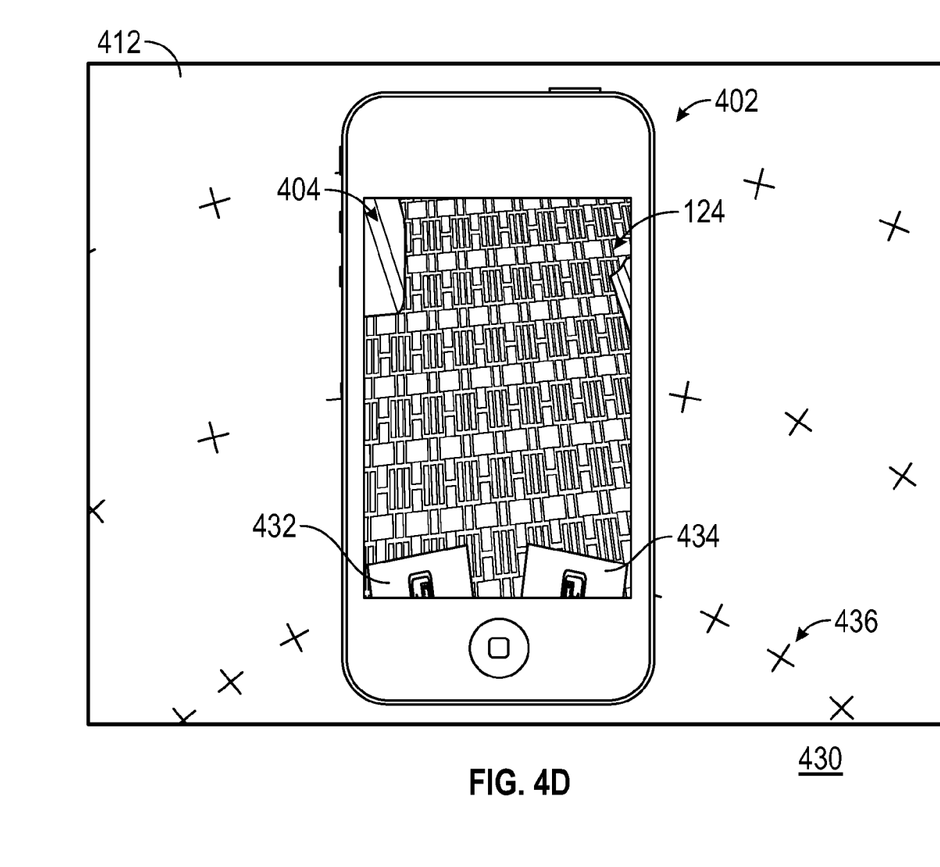

The simulated three-dimensional environment 412 is displayed using perspective projection. Virtual objects that are further away from a user appear smaller than virtual objects that are closer to the user. Perspective projection shows distant virtual objects as smaller in order to provide additional realism. Perspective projection also skews virtual objects according to their distance from and orientation relative to the virtual viewport of the simulated three-dimensional environment 412. For example, FIG. 4D provides another illustration 430 of the display provided to the audience after the tablet computer 110 has been rotated downward (e.g., towards the floor) about the x-axis. The demonstration application 122 provides an indication that a bottom region of the simulated three-dimensional environment 412 is within view by the plus symbols 436 that are closer in position and form a smaller diameter circle than the plus symbols of FIG. 4C. Two virtual objects 432 and 434 are partially displayed by the orientation aware application 124, indicating locations of items on the floor or associated with the floor.

A rotation of the tablet computer 110 in a first direction along an x-y axis results in rotation of the display of the simulated three-dimensional environment 412 in a second, opposite direction along the same x-y axis. For example, as the demonstrator continues to rotate the tablet computer 110 downward, as provided in the illustration 440 of FIG. 4E, the plus symbols 446 and 444 move upward in the simulated three-dimensional environment 412, respectively. Consequently, the orientation aware application 124 fully displays the two virtual objects 432 and 434 in the video feed 124. The visual representation of smartphone 402, however, remains fixed relative to the x-y axis of rotation, so as to, for example, establish a perception of its rotation via the peripheral rotation of its environment. This technique is used to accurately reflect a viewpoint of an actual smartphone user holding a device. A translation (e.g. in latitude and longitude) of the tablet computer 110 can be reflected in a similar manner. A translation of the tablet computer 110 results in an equal but opposite translation of the simulated three-dimensional environment 412, while the visual representation of the virtual device 402 remains fixed, so as to, for example, establish a perception of its translation via the peripheral translation of its environment. As a result, the visual representation of the smartphone 402 does not change position, nor does it deviate from its orientation perpendicular to the z-axis. By reflecting changes in translation and rotation of the tablet computer 110 by means of equal and opposite changes to the peripheral environment 412, the demonstration application 122 simulates the visual experience of a user viewing a smartphone while moving within and looking around a physical three-dimensional environment.

Figure 4E:
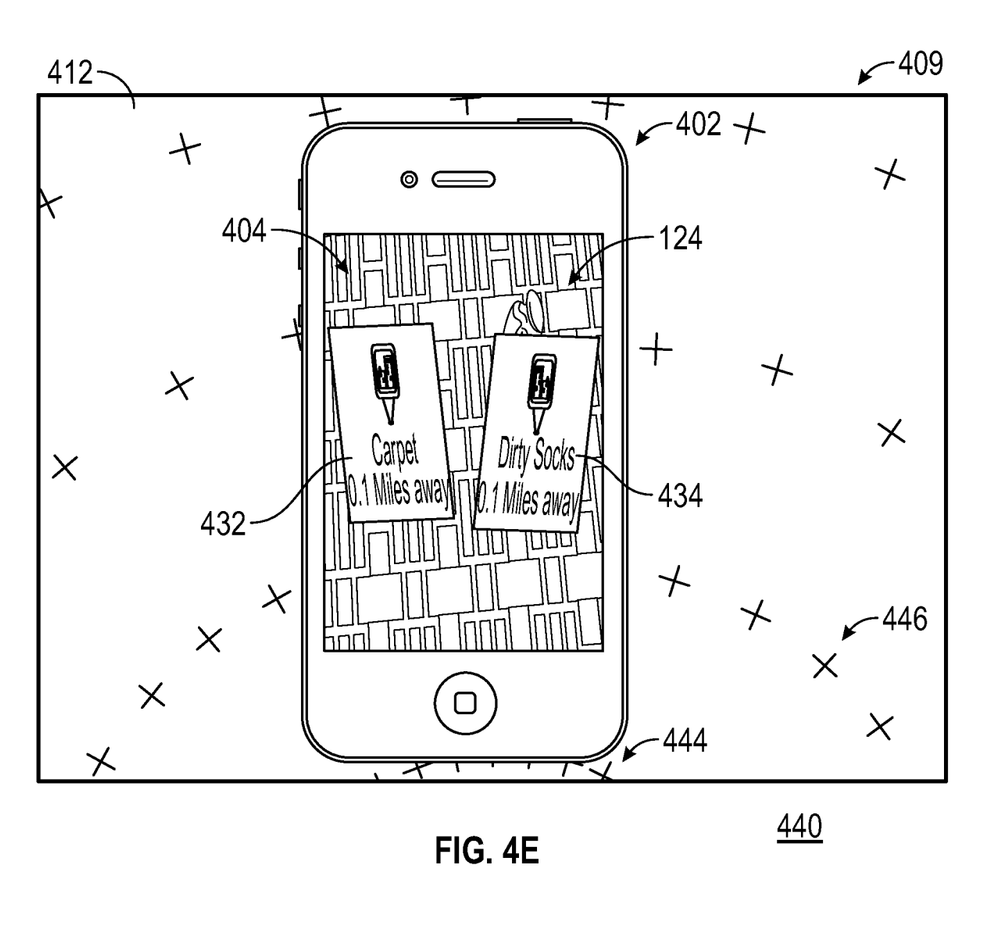

Due to the simulated three-dimensional environment 412 being in a spherical shape, the plus symbols 436 representing the simulated three-dimensional environment 412 are closer towards the bottom of the simulated three-dimensional environment 412, as represented by the different sets of plus symbols 436 and 444 that increasingly skew towards the bottom of the simulated spherical three-dimensional environment 412. This skewing is due to the simulated three-dimensional environment being displayed using perspective projection. The process 300 then ends in step 304.

Figure 1:
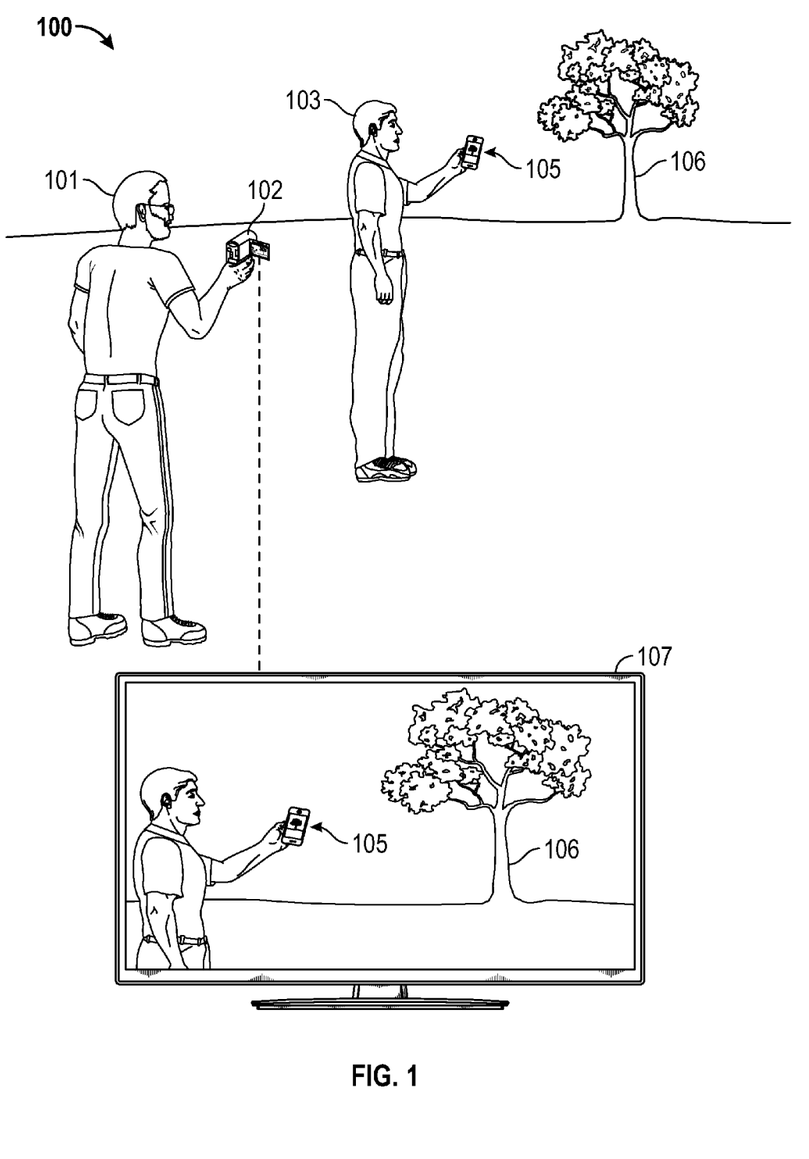
FIG. 1 illustrates a setup for presenting an orientation aware application according to the prior art.
Figure 5:
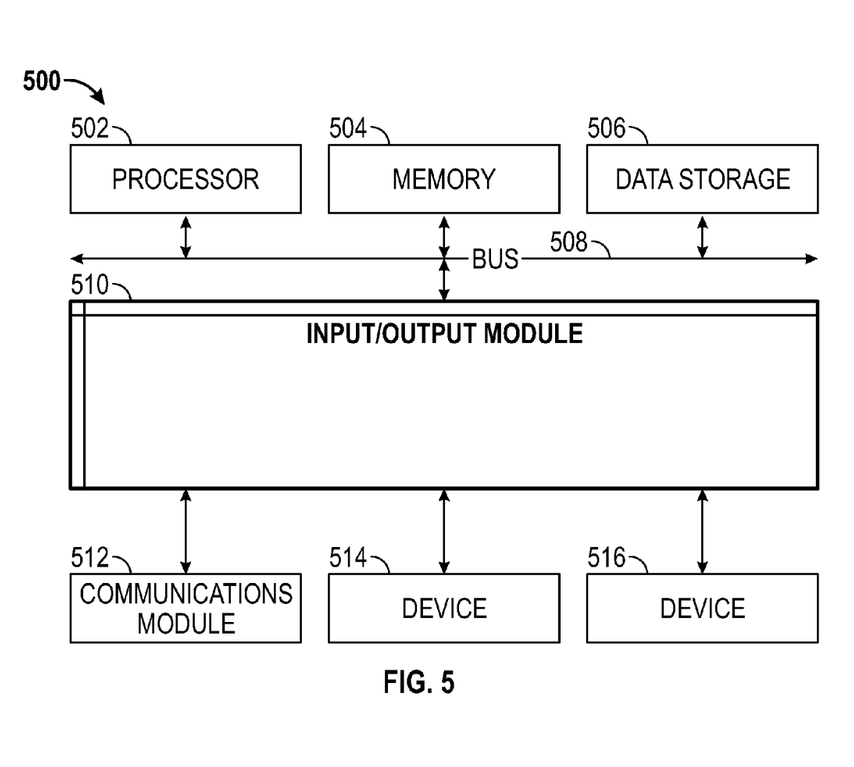
FIG. 5 is a block diagram illustrating an exemplary computer system with which the client of FIG. 2 can be implemented.

FIG. 5 is a block diagram illustrating an exemplary computer system 500 with which the client 110 of FIG. 1 can be implemented. In certain aspects, the computer system 500 may be implemented using hardware or a combination of software and hardware, either in a dedicated server, or integrated into another entity, or distributed across multiple entities.

Computer system 500 (e.g., client 110) includes a bus 508 or other communication mechanism for communicating information, and a processor 502 (e.g., processor 112) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 120), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, offside rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., visual input device 126, orientation sensor(s) 128). The input/output module 510 can be any input/output module. Exemplary input/output modules 510 include data ports such as USB ports. The input/output module 510 is configured to connect to a communications module 512. Exemplary communications modules 512 (e.g., communications module 118) include networking interface cards, such as Ethernet cards and modems. In certain aspects, the input/output module 510 is configured to connect to a plurality of devices, such as an input device 514 (e.g., control input device 116) and/or an output device 516 (e.g., output device 114). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a CRT (cathode ray tube) or LCD (liquid crystal display) monitor, for displaying information to the user.

According to one aspect of the present disclosure, the client 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Systems, methods, and machine-readable media for presenting an orientation aware application on a device have been described. In certain embodiments, a mathematically driven, graphical demonstration system of the demonstrator's view of the orientation aware application and surrounding environment are provided. The demonstration system can run on a mobile device configured to run the orientation aware application, and can act as a wrapper of the presenting the orientation aware application on a device to be demonstrated. The output of the demonstration system can be displayed to an audience. The demonstration system renders the orientation aware application within the context of a simulated three-dimensional environment. The demonstration system then manipulates the simulated three-dimensional environment, including a simulated device in the foreground and a simulated three-dimensional environment in the background, in such a way so as to mirror the mobile device's actual orientation and movement through space. For example, as the demonstrator turns left, the simulated three-dimensional environment background rotates right, achieving the result that the simulated device appears to turn left in the simulated three-dimensional environment. For visual context, the orientation aware application can be framed by a virtual representation of a device in which the orientation aware application would actually run. In certain aspects, because the demonstration system can run on a device with equivalent sensor capabilities as the simulated device, the demonstrator can simply use the demonstration device just as the demonstrator would use the simulated device. Both the augmented reality application and the demonstration system have access to the device's sensor data, and so are both capable of determining and responding to the device's orientation and movement through space.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for presenting an orientation aware three-dimensional application on a device, the method comprising:

receiving visual data providing an image of a physical three-dimensional environment and orientation data indicating an orientation of an actual device within the physical three-dimensional environment;

providing, for display on the actual device, a visual representation of a virtual device displaying an orientation aware application displaying the image of the physical three-dimensional environment; and providing, for display on the actual device in at least a portion of the area surrounding the display of the visual representation of the virtual device on the actual device, a visual representation using perspective projection of a simulated three-dimensional environment as a spherical three-dimensional environment or a flat three-dimensional environment, wherein the visual representation of the virtual device appears within the simulated three-dimensional environment based on the orientation data indicating the orientation of the actual device within the physical three-dimensional environment, and wherein motion of the image of the physical three-dimensional environment as displayed by the orientation aware application displayed by the visual representation of the virtual device is tied with motion of the visual representation of the spherical three-dimensional environment or the flat three-dimensional environment displayed in the at least the portion of the area surrounding the display of the visual representation of the virtual device.

2. The computer-implemented method of claim 1, wherein the orientation aware application is an augmented reality application.

3. The computer-implemented method of claim 1, wherein the display of the visual representation of the virtual device and a display of the simulated three-dimensional environment are continuously updated based on the received orientation data indicating the orientation of the actual device within the physical three-dimensional environment.

4. The computer-implemented method of claim 1, wherein the visual representation of the virtual device is based on a degree of rotation about a z-axis.

5. The computer-implemented method of claim 1, wherein the orientation data comprises data received from at least two of a geolocation sensor, a gyroscope, an accelerometer, and a compass.

6. The computer-implemented method of claim 1, wherein the simulated three-dimensional environment is based on an expected field of view of an observer.

7. The computer-implemented method of claim 6, wherein a size of the visual representation of the virtual device is scaled proportionately according to field of view parameters of the actual device.

8. The computer-implemented method of claim 1, wherein the received orientation data is provided both to the orientation aware application and to orient the simulated three-dimensional environment with the physical three-dimensional environment.

9. The computer-implemented method of claim 1, wherein a z-axis view of the virtual device remains fixed.

10. The computer-implemented method of claim 1, wherein a movement of the actual device in a first direction along an x-y axis results in movement of the display of the simulated three-dimensional environment in a second, opposite direction along the x-y axis.

11. The computer-implemented method of claim 1, wherein the orientation aware application displayed on the virtual device is installed on the actual device.

12. A system for presenting an orientation aware application on a device, the system comprising:

a memory comprising an orientation aware application; and a processor configured to execute instructions to:

receive visual data providing an image of a physical three-dimensional environment and orientation data indicating an orientation of an actual device within the physical three-dimensional environment;

provide, for display on the actual device, a visual representation of a virtual device displaying the orientation aware application displaying the image of the physical three-dimensional environment, providing, for display on the actual device in at least a portion of the area surrounding the display of the visual representation of the virtual device on the actual device, a visual representation using perspective projection of a simulated three-dimensional environment as a spherical three-dimensional environment or a flat three-dimensional environment, wherein the visual representation of the virtual device appears within the simulated three-dimensional environment that is based on the orientation data indicating the orientation of the actual device within the physical three-dimensional environment, and wherein motion of the image of the physical three-dimensional environment as displayed by the orientation aware application displayed by the visual representation of the virtual device is tied with motion of the visual representation of the spherical three-dimensional environment or the flat three-dimensional environment displayed in the at least the portion of the area surrounding the display of the visual representation of the virtual device.

13. The system of claim 12, wherein the orientation aware application is an augmented reality application.

14. The system of claim 12, wherein the display of the visual representation of the virtual device and a display of the simulated three-dimensional environment are continuously updated based on the received orientation data indicating the orientation of the actual device within the physical three-dimensional environment.

15. The system of claim 12, wherein the visual representation of the virtual device is based on a degree of rotation about a z-axis.

16. The system of claim 12, wherein the orientation data comprises data received from at least two of a geolocation sensor, a gyroscope, an accelerometer, and a compass.

17. The system of claim 12, wherein the simulated three-dimensional environment is based on an expected field of view of an observer.

18. The system of claim 17, wherein a size of the visual representation of the virtual device is scaled proportionately according to field of view parameters of the actual device.

19. The system of claim 12, wherein the received orientation data is provided both to the orientation aware application and to orient the simulated three-dimensional environment with the physical three-dimensional environment.

20. The system of claim 12, wherein a z-axis view of the virtual device remains fixed.

21. The system of claim 12, wherein a movement of the actual device in a first direction along an x-y axis results in movement of the display of the simulated three-dimensional environment in a second, opposite direction along the x-y axis.

22. A non-transitory machine-readable storage medium comprising machine-readable instructions for causing a processor to execute a method for presenting an orientation aware application on a device, the method comprising:

receiving visual data providing an image of a physical three-dimensional environment and orientation data indicating an orientation of an actual device within the physical three-dimensional environment;

providing, for display on the actual device, a visual representation of a virtual device displaying an orientation aware application displaying the image of the physical three-dimensional environment; and providing, for display on the actual device in at least a portion of the area surrounding the display of the visual representation of the virtual device on the actual device, a visual representation using perspective projection of a simulated three-dimensional environment as a spherical three-dimensional environment or a flat three-dimensional environment, wherein the visual representation of the virtual device appears within the simulated three-dimensional environment that is based on the orientation data indicating the orientation of the actual device within the physical three-dimensional environment, and wherein motion of the image of the physical three-dimensional environment as displayed by the orientation aware application displayed by the visual representation of the virtual device is tied with motion of the visual representation of the spherical three-dimensional environment or the flat three-dimensional environment displayed in the at least the portion of the area surrounding the display of the visual representation of the virtual device.

* * * * *